Jan. 19, 1954     C. C. McCAIN     2,666,591
APPARATUS FOR APPLYING STICKY STRAND MATERIAL TO ARTICLES
Filed May 7, 1951     3 Sheets-Sheet 1
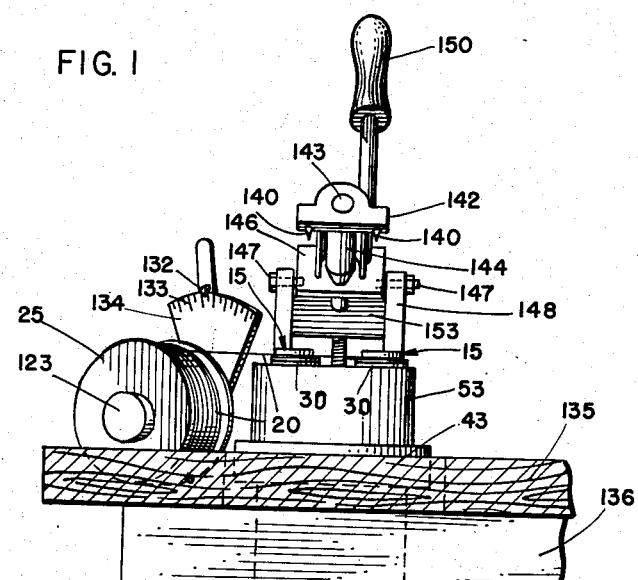
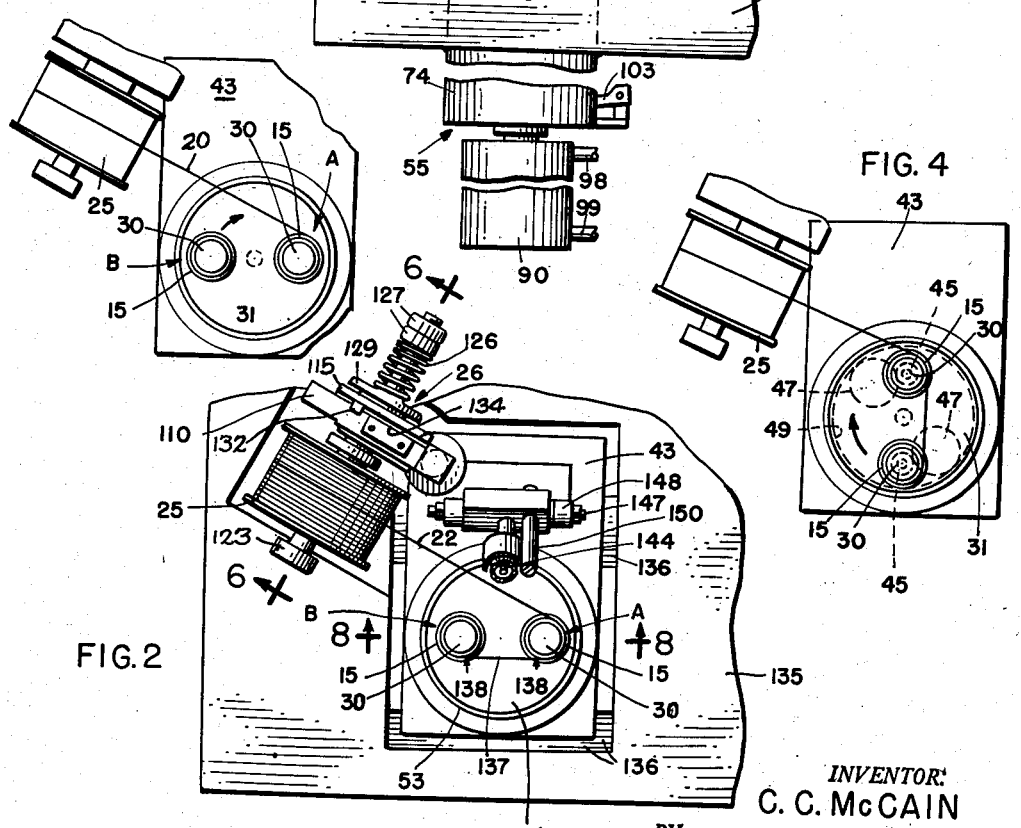
INVENTOR:
C. C. McCAIN
BY
ATTORNEY

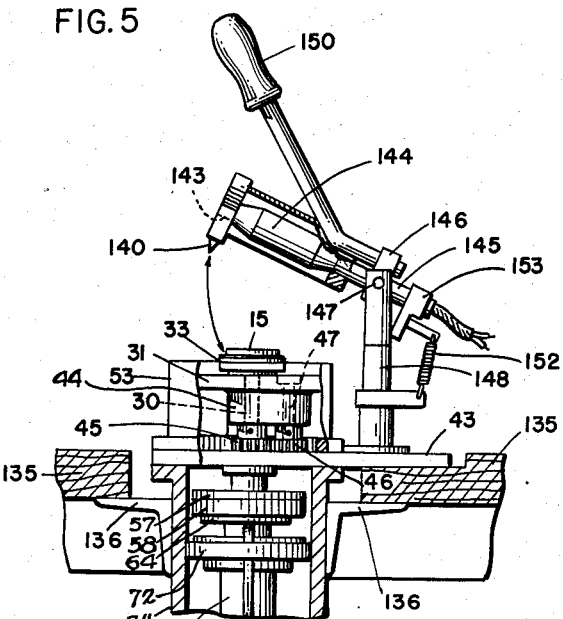
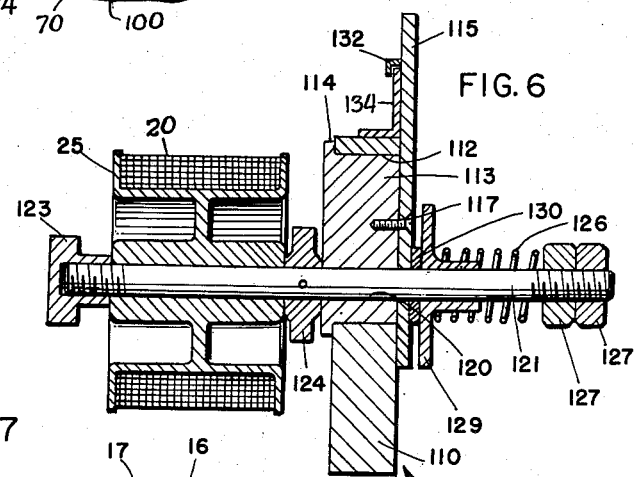
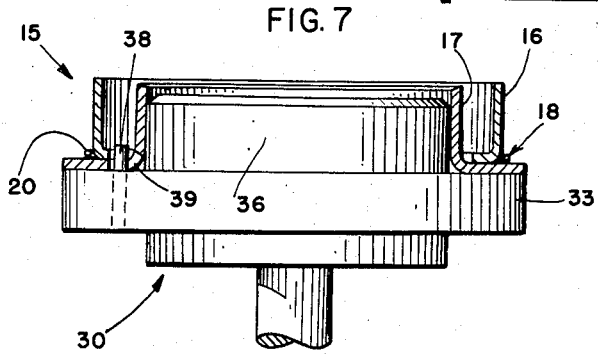

Jan. 19, 1954
C. C. McCAIN
2,666,591
APPARATUS FOR APPLYING STICKY STRAND MATERIAL TO ARTICLES
Filed May 7, 1951
3 Sheets-Sheet 3
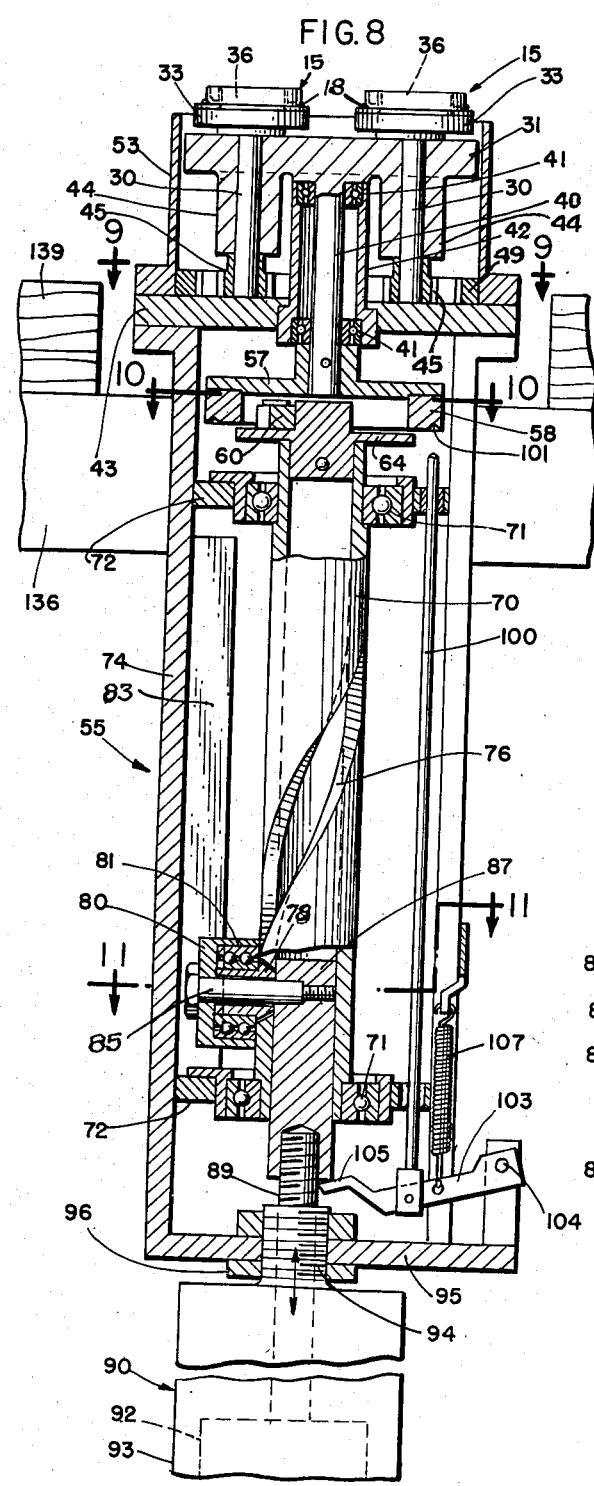
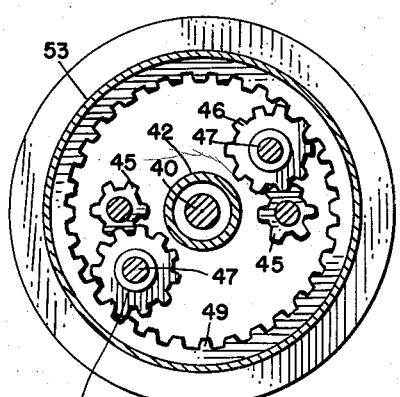
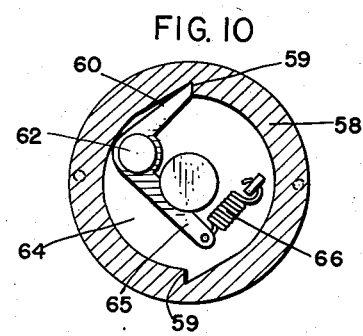
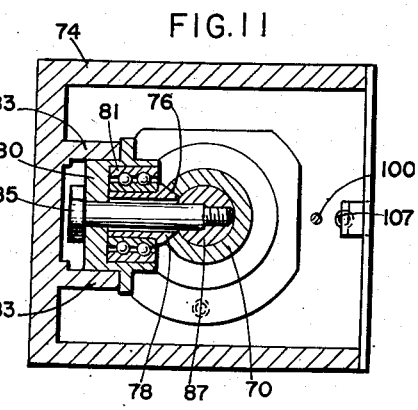
INVENTOR:
C. C. McCAIN
BY
E. F. Kane
ATTORNEY Patented Jan. 19, 1954

2,666,591

UNITED STATES PATENT OFFICE 2,666,591

APPARATUS FOR APPLYING STICKY STRAND MATERIAL TO ARTICLES

Cecil C. McCain, Glen Ellyn, Ill., assignor to Western Electric Company, Incorporated, New York, N. Y., a corporation of New York Application May 7, 1951, Serial No. 224,858

10 Claims. (Cl. 242—7)

This invention relates to an apparatus for applying sticky strand material to articles and more particularly to a device for winding a strand impregnated with a sticky compound around annular magnet parts to form a seal between the parts.

In the manufacture of a certain type of telephone transmitters an annular magnet is used which is made from two annular flanged magnet parts with their flanges spot welded together. The annular magnet is fabricated with other elements into an acoustical chamber into which the sound waves are admitted through a restricted opening. In order to insure that there are no interstices between the welded flanges of the two magnet parts through which sound waves may pass, a sealing compound is applied in the groove formed where the magnet parts are welded together. The sealing element is in the form of a strand coated with a sticky sealing compound. Because the sticky compound adheres to anything that it comes in contact with, the application of the strand to the magnet presents various problems.

It is an object of the present invention to provide a simple apparatus for applying sticky strand material to articles.

In accordance with one embodiment of the invention an apparatus is provided having a pair of spindles, each provided with a seat for supporting the annular magnets to which the compound coated strand is to be applied. The spindles are mounted diametrically opposite each other in a rotatable disc and equi-distant from the axis thereof for rotation about their own axes and for revolving movement about the axis of the disc. Drive means is provided to intermittently revolve or index the disc through 180° and to rotate the spindles and the articles carried thereby about their own axes through at least two and one-half complete revolutions for each indexing movement. A reel of strand coated with tacky sealing compound is adjustably supported to allow the end thereof to be withdrawn from the reel in a horizontal plane and pressed into adhering engagement with the walls of the annular groove in one of the magnets on one of the spindles. An unsealed second magnet is applied to the other spindle and the disc is indexed to cause the magnets to be revolved through 180° to carry the second magnet into engagement with an intermediate portion of the sticky strand and to cause the first part to wind two and one-half convolutions of the strand around itself in the annular groove thereof. A portion of the strand extends from one to the other of the magnets after each winding operation which unused portion of strand may be severed by a pair of heated knife blades mounted for movement into engagement with the strand. After the unused portion of the strand is severed and removed the sealed magnet is removed from the spindle and an unsealed magnet applied thereto.

Other objects, advantages, and features of the invention will become apparent by reference to the following detailed description thereof considered in conjunction with the accompanying drawings illustrating a preferred embodiment thereof in which Fig. 1 is a front elevational view of the apparatus for applying tacky strand material to annular articles;

Fig. 2 is a plan view of the apparatus with two articles thereon after a winding operation;

Fig. 3 is a diagrammatic plan view of a portion of the apparatus with two articles thereon before a winding operation;

Fig. 4 is a view similar to Fig. 3 showing the apparatus and the articles in an intermediate position;

Fig. 5 is a fragmentary side elevational view of the apparatus with parts broken away;

Fig. 6 is a vertical axial sectional view through the mechanism for adjustably supporting the supply reel;

Fig. 7 is an enlarged fragmentary view of one of the spindles with an article to be sealed in position thereon;

Fig. 8 is a vertical sectional view of the apparatus taken on the line 8—8 of Fig. 2; and Figs. 9, 10, and 11 are horizontal cross-sectional views taken on the lines 9—9, 10—10, and 11—11, respectively of Fig. 8.

Referring to the drawings, there is shown in Fig. 7 an annular composite magnet 15 comprising a pair of annular metal rings 16 and 17 each having an angular or L shaped cross-section with the transversely extending flanges thereof welded to each other. An annular groove 18 is formed by portions of the component rings 16 and 17, and it is desirable to wind a sealing element in the form of several convolutions of strand 20 impregnated and coated with a sticky compound for sealing the groove.

A supply of the strand 20 is wound on a reel 25 which is rotatably supported in a device generally indicated 26 for vertically adjusting the reel to permit the free end of the strand 20 to be withdrawn from the supply under tension in a horizontal plane at a predetermined level. The free end of the strand 20 is pressed against and adheres to the groove portion 18 of a magnet 15 mounted on one of a pair of article supporting spindles 30—30 rotatably mounted on a rotatable disc or member 31.

The spindles 30 are provided with heads 33 having annular seats formed thereon by upwardly extending portions 36 for supporting the annular magnets 15 at a predetermined elevation. A pin 38 extending upwardly from each of the heads 33 is engageable in an aperture 39 in the magnet 15 to hold the magnet against rotation relative to the spindle. The disc 31 is adapted to be rotated about an axis midway between the spindles 30 and has a shaft 40 extending downwardly therefrom which is rotatably supported in bearings 41—41 which in turn are mounted in a tubular member 42 fixed to or formed as part of a horizontal supporting plate 43. The spindles 30 are rotatably mounted in apertured bearing bosses 44 extending downwardly from the disc 31 and have gears 45 fixed to their lower ends which mesh with gears 46 fixed to shafts 47 which are also rotatably supported in apertures in the bosses 44 (Fig. 5). The gears 46 mesh with an internal ring gear 49 mounted on the plate 43 within a cylindrical housing member 53 which extends upwardly from the plate 43 and encloses the gearing and the disc 31. The gearing is arranged so that as the spindle carrying disc 31 is revolved 180° the spindles 30 and the annular magnets 15 thereon are caused to rotate about their respective axes through predetermined arcuate distances, preferably two and one-half or more rotations.

Drive mechanism 55 is provided to index the disc 31 through 180° and cause the free end of strand 20 which is adhered to a first magnet on a spindle to be wound around the first magnet through two and one-half complete convolutions and to cause the second magnet on the other spindle to be moved through an arc into engagement with an intermediate portion of the strand which is horizontally aligned with and will engage the magnet in the groove portion 18 thereof.

The drive mechanism 55 comprises a ratchet disc 57 which is fixed to the lower end of the shaft 40 on the disc 31 and has ring or flange 58 extending downwardly therefrom which has a pair of recesses forming teeth or abutments 59. The teeth 59 are adapted to be engaged by a driving pawl 60 in the form of a bell crank pivotally mounted at 62 on disc 64 and having an arm 65 to which is connected a spring 66 for urging the driving pawl 60 outwardly into engagement with the teeth 59 on the disc 57. The disc 64 is secured to the top end of a tubular cam member 70 which is mounted for oscillation in bearings 71—71 in a pair of walls 72 of a U-shaped box-like frame member 74 extending downwardly from and secured to the supporting plate 43. A cam slot 76 is formed in the tubular member 70 for receiving a cam roller 78 which is rotatably mounted on a slide block or member 80 in anti-friction bearings 81. The slide block 80 is guided for vertical movement between a pair of rails 83—83 forming a guideway for guiding the block 80 and the cam roller 78 for vertical movement.

A cap screw 85 passing through an aperture in the roller 78 secures the slide block 80 and the roller 78 to a cylindrical member 87 having a threaded recess at its lower end for threadedly receiving the upper end of the piston rod 89 of a fluid motor 90. The piston rod 89 at its lower end is secured to a piston 92 reciprocable within the cylinder 93 of the fluid motor. A threaded sleeve 94 extending upwardly from the fluid motor passes through an aperture in a wall 95 of the frame member 74 and is engaged by a pair of lock nuts 96 for securing the fluid motor 90 to the frame member 74. Compressed air or other fluid under control of manually operated valves (not shown) is passed through pipe lines 98—99 to opposite ends of the cylinder 93 to cause the reciprocation of the piston 92 and the roller 78. The spiral cam groove 76 and the vertical traverse of the cam roller 78 are such as to impart an oscillation of 180° to the tubular cam member 70 for each a reciprocation of the piston to impart intermittent rotation through 180° to the disc 31 and the spindles 30 and also to effect the rotation of each spindle through two and one-half revolutions for each indexing movement of the disc 31.

In order to prevent the overdrive of the disc 31 a rod 100 is provided having a tapered end which is adapted to be moved into engagement with one of a pair of recesses 101 in the ratchet disc 57 when the piston 92 is moved upwardly. At its lower end the rod 100 is pivotally connected to a lever 103 supported at 104 on the wall 95 and having its free end 105 engageable with the lower end of the member 87 on the piston rod 89. A spring 107 urges the rod 100 upwardly so that as the roller 78 is moved upwardly to oscillate the cam member 70 to cause the rotation of the ratchet disc 57 and the spindle carrying disc 31, the end of the rod 100 will be moved into engagement with the lower face of the flange 58 on the ratchet disc 57 and enter one of the pair of recesses 101 therein at the end of the upward stroke of the roller 78 to prevent the overtravel of the disc 57 and to stop the spindles in predetermined positions or stations indicated A and B (Figs. 2, 3 and 4).

The device 26 for supporting the supply reel 25 comprises a block 110 secured to the plate 43 and provided with a circular aperture 112 (Fig. 6) for receiving a cylindrical member 113 therein. A flange 114 on the member 113 engageable with one side of the block 110 and a lever 115 secured to the block 113 by a screw 117 and engageable with the other side of block serves to prevent axial displacement of the member 113 in adjusted angular position in the block 110. A bore 120 is formed in the members 113 and 115 in eccentric relation to the axis of the member 113 for rotatably receiving a rod 121 therein on which the supply reel 25 is adapted to be mounted. A hand nut 123 threadedly engaging one end of the rod 121 is adapted to lock the reel 25 against a collar 124 pinned to the rod 121 for removably securing the reel in position thereon.

The reel 25 and the rod 121 are adapted to be yieldably and frictionally held against rotation by an adjustable tensioning device for varying the tension of the strand as it is withdrawn from the supply reel. The tension device comprises a spring 126 interposed between adjustable lock nuts 127 and a collar 129 which bears against a disc 130 of friction material interposed between the collar 129 and the lever 115. The spring 126 serves to stress the rod 121 axially and urge the collar 124 against the eccentric member 113 to yieldably resist the rotation of the rod 121 and the strand supply reel 25 thereon.

By moving the lever 115 the eccentric member 113 may be rotated to raise the reel 25 and adjust the level of the portion of the strand being withdrawn from the reel so as to maintain it substantially in a horizontal plane in alignment with the grooves 18 of the annular magnets 15 on the spindles 30. A pointer 132 on the lever 115 cooperates with calibrations 133 on a dial 134 mounted on the block 110 to indicate the vertical position of the reel 25.

The apparatus may be supported in any suitable manner. As illustrated herein the device is shown as attached to a table or bench 135 by angle iron brackets 136 secured to the under side of the table 135 and to the frame member 74.

In the operation of the device a pair of annular magnets 15 are applied to the spindles 30 and the free end of the strand 22 is pressed into the groove 18 of the first magnet 15 in position A as shown in Fig. 3. The fluid motor 90 is then actuated to index the spindle carrying disc 31 and cause the first magnet to be revolved into position B and the second magnet to be revolved into position A. As the first magnet moves from position A to position B it is rotated and causes two and one-half convolutions of strand 20 to be wound therearound and as the second magnet revolves from position B to position A it moves into engagement with the intermediate horizontally disposed portion of the strand (Fig. 4) which engages the magnet in the groove portion 18 thereof. The two magnets then occupy the position shown in Fig. 2 with two and one-half convolutions of the sealing strand being wrapped around the magnet on the spindle in position B and with a straight disposable portion 137 of strand extending between the peripheries of the two magnets.

Means are provided for severing the straight portion 137 of the strand at points 138 (Fig. 2) which comprises a pair of knife blades 140 fixed to the underneath side of a metal bar 142 which is mounted on the core 143 of an electrical heating unit 144. The heating unit 144 is fixed to a cross member 146 pivotally mounted in pins 147 for oscillatable movement in a pair of posts 148 secured to the plate 42. A lever 150 secured to the cross member 146 is provided to move the heated cutters 140 from their normal up position shown in Fig. 5 to a lower operative position in engagement with the portion 137 of the strand at points 138—138 for severing the strand as previously stated. A spring 152 connected to one end of a rod 145 on the member 146 yieldably retains the cutters 140 in their upper position and a stop member 153 mounted on the rod 145 engages the post 152 and serves to limit the upward movement of the cutters.

Thus, when annular magnet 15 has been wound with two and one-half convolutions of the coated strand and has arrived at position B as shown in Fig. 2 the operator actuates the heated cutters 140 to sever the straight portion 137 of the strand at points 138 which portion 137 may then be disposed of. The magnet 15 with the strand of sealing compound wound thereon may then be removed from the spindle 30 and an unsealed magnet applied thereto after which the operator may actuate the fluid motor to initiate another cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for winding sticky strand onto articles comprising a member rotatable about a predetermined axis, a plurality of spindles mounted on said member for rotation about axes disposed parallel to, equi-distant from, and equi-angularly about said predetermined axis and having seats for supporting said articles, means for supporting a supply of said sticky strand in a position to permit the strand to extend from said supply directly to an article on one of said spindles and be adhered to said article and to permit the withdrawal of said strand in the path of movement of said articles, means for indexing said member through a predetermined arcuate distance, and gearing means including a stationary gear for rotating said spindles and the articles thereon through a predetermined arcuate distance about the axes of said spindles in response to the indexing movement of said member for wrapping several convolutions of said strand about one of said articles and for moving another article into engagement with said strand.

2. A device for winding sticky strand onto articles comprising a member rotatable about a predetermined axis, a plurality of spindles mounted on said member for rotation about axes disposed substantially parallel to, equi-distant from, and equi-angularly about said predetermined axis and having holders for supporting said articles, means for supporting a supply of said sticky strand in a position for movement of the strand directly from said supply to be adhered to an article on one of said spindles and into adhering engagement therewith and to permit the withdrawal of said strand in the path of movement of said articles, means for indexing said member through a predetermined arcuate distance, gearing means including a stationary gear for rotating said spindles and the articles thereon about the axes of said spindles in response to the indexing of said member for wrapping said strand about one of said articles and for moving another article into engagement with said strand, means for adjusting said supporting means to position the strand withdrawn from said supply substantially in a plane perpendicular to said predetermined axis for engaging the articles in a predetermined position thereon, and means for severing the portion of said strand extending between said articles.

3. A device for winding sticky strand onto articles comprising a member rotatable about a predetermined axis, a plurality of spindles mounted on said member at predetermined stations for rotation about axes disposed substantially parallel to, equi-distant from, and equi-angularly about said predetermined axis and having seats for supporting said articles, means for rotatably supporting a supply reel of said sticky strand for rotation about an axis perpendicular to said axes and in a position to permit the free end thereof to be adhered to an article on one of said spindles and to permit the withdrawal of said strand in the path of movement of said articles and substantially along a plane passing through a predetermined portion of said articles, drive means for indexing said member to advance said spindles and articles thereon from one station to the next station, means for rotating said spindles and the articles thereon through a predetermined arcuate distance about the axes of said spindles simultaneously with the indexing of said member for wrapping a predetermined length of said strand about one of said articles and for moving another article into engagement with said strand, and means for adjusting the means for supporting the reel to maintain the portion of the strand being withdrawn from the reel in substantial alignment with said plane.

4. A device for winding sticky strand onto articles comprising a pair of rotatable article holders, a member for supporting said article holders for rotation about parallel axes in spaced relation to each other, means mounting said member for rotation about a predetermined axis between and parallel to the axes of said holders, means for indexing said member to advance said article holders and articles thereon through a predetermined arcuate distance, gearing means including a stationary gear for rotating said article holders and the articles thereon about the axes of said holders through a predetermined arcuate distance in response to the indexing of said member, means for supporting a supply of said sticky strand in a predetermined relation to said article holders to permit the strand to extend directly from the supply and be adhered to an article on one of said holders and the strand to be advanced in the path of movement of and engaged by the articles on said holders whereby in response to the indexing of said member the article on one of said holders is rotated to wind a predetermined length of said strand thereon and the article on the other holder is moved into adhering engagement with a portion of said strand, and means for adjusting the supporting means to vary the position of said supply for guiding said strand for movement substantially in a plane perpendicular to said predetermined axis and in a predetermined position axially of said holders to engage the articles thereon at a predetermined point.

5. A device for winding sticky strand onto articles comprising a pair of rotatable article holders, a member for supporting said article holders for rotation about parallel axes in spaced relation to each other, means mounting said member for rotation about a predetermined axis midway between and parallel to the axes of said holders, means for indexing said member to advance said article holders and articles thereon through a predetermined arcuate distance, gearing means including a stationary gear for rotating said article holders and the articles thereon about the axes of said holders through a predetermined arcuate distance in response to the indexing of said member, means for supporting a reel supply of said sticky strand for rotation about an axis in a plane perpendicular to said predetermined axis and in a predetermined relation to said article holders to permit the strand to extend directly from said reel and be adhered to an article on one of said holders and the strand to be advanced in the path of movement of and engaged by the articles on said holders whereby in response to the indexing of said member the article on one of said holders is rotated to wind a predetermined length of said strand thereon and the article on the other holder is moved into adhering engagement with a portion of said strand, and cutters for simultaneously cutting the strand at spaced points to sever the portion of said strand extending between said articles.

6. A device for winding strand coated with tacky compound onto articles comprising a member rotatable about a predetermined axis, a pair of spindles mounted on said member for rotation about axes disposed parallel to, equi-distant from, and equi-angularly about said predetermined axis and having seats for supporting said articles, means for supporting a supply of said sticky strand in a position to permit the strand to extend directly from the supply onto an article on one of said spindles and be adhered thereto and to permit the withdrawal of said strand in the path of movement of said articles, means for indexing said member to move said spindles and articles thereon through a predetermined arcuate distance, gearing means including a stationary ring gear for rotating said spindles and the articles thereon about the axes of said spindles in response to the indexing movement of said member for wrapping a predetermined length of said strand about one of said articles and for moving another article into engagement with said strand, and means for adjusting said supporting means to maintain the strand being withdrawn from said supply substantially in a plane perpendicular to said predetermined axis for engagement with a predetermined portion of said articles.

7. A device for winding strand coated with tacky compound onto articles comprising a member rotatable about a predetermined axis, a pair of spindles mounted on said member for rotation about axes disposed parallel to, equi-distant from, and equi-angularly about said predetermined axis and having seats for supporting said articles, means for supporting a supply of said sticky strand in a position to permit the strand to extend from said supply directly to an article on one of said spindles and be adhered thereto and to permit the withdrawal of said strand in the path of movement of said articles, means for indexing said member to move said spindles and articles thereon through a predetermined arcuate distance, gearing means including a stationary gear for rotating said spindles and the articles thereon about the axes of said spindles in response to the indexing movement of said member for wrapping said strand about one of said articles and for moving another article into engagement with said strand, a pair of knives, and means mounting said knives for movement into engagement with said strand for severing the portion of said strand extending between said articles.

8. A device for winding strand coated with a tacky compound onto annular parts comprising a pair of spindles having seats thereon for supporting a pair of said parts, rotatable supporting means mounting said spindles for rotation about their axes and for movement about a predetermined axis between the axes of said spindles, means for rotating said spindles about their axes in response to rotation of said supporting means, means for indexing said supporting means through 180° to move the parts on said spindles through a predetermined path from a first position to a second position and from said second position to said first position, respectively, means for supporting a reel containing a supply of said coated strand for rotation about an axis perpendicular to said axes to permit the free end thereof to be withdrawn from the reel in substantial alignment with a predetermined plane passing through a predetermined portion of the parts carried by said spindles whereby a portion of said strand having its end adhered to one part on one spindle is wound onto said part and another portion of said thread is guided into adhering engagement with the other part on the other spindle in response to an indexing movement of said supporting member, and means for adjusting said reel supporting means to maintain the strand withdrawn therefrom substantially in alignment with said plane.

9. A device for winding strand coated with a tacky compound onto annular parts comprising a pair of spindles having seats thereon for supporting a pair of said parts, rotatable supporting means mounting said spindles for rotation about their axes and for movement about a predetermined axis midway between the axes of said spindles, means for rotating said spindles about their axes in response to rotation of said supporting means, means for indexing said supporting means through 180° to move the parts on said spindles through a predetermined path from a first position to a second position and from said second position to said first position, respectively, means for supporting a reel containing a supply of said coated strand to permit the free end thereof to be withdrawn from the reel in substantial alignment with a predetermined plane passing through a predetermined portion of the parts carried by said spindles whereby a portion of said strand having its end adhered to one part on one spindle is wound onto said part and another portion of said thread is guided into adhering engagement with the other part on the other spindle in response to an indexing movement of said supporting member, means for adjusting said reel supporting means to maintain the strand withdrawn therefrom substantially in alignment with said plane, a pair of knives, means for heating said knives, and means mounting said knives for movement through a predetermined path to sever the portion of the strand extending between said parts.

10. A device for winding strand coated with tacky compound onto articles comprising a pair of rotatable article holders, a member for supporting said article holders at predetermined stations and for rotation about parallel axes in spaced relation to each other, means mounting said member for rotation about a predetermined axis midway between and parallel to the axes of said holders, means for indexing said member to advance said article holders and articles thereon from one station to the next, means including a stationary ring gear and gears on said spindles for rotating said article holders and the articles thereon about the axes of said holders through a predetermined arcuate distance in response to the indexing of said member, a rod for rotatably supporting a reel supply of said sticky strand, means including an eccentric member for adjustably mounting said rod to support said reel in a predetermined relation to said article holders thereby to permit an end of the strand on the reel to be adhered to an article on one of said holders and the strand to be withdrawn from the reel in the path of movement of and engaged by the articles on said holders and in substantial alignment with a plane passing through a predetermined portion of said articles whereby in response to the indexing of said member the article on one of said holders is rotated to wind a predetermined length of said strand thereon and the article on the other holder is moved into adhering engagement with a portion of said strand, and means for oscillating said eccentric member to adjust the position of said reel to maintain the strand withdrawn therefrom substantially in alignment with said plane.

CECIL C. McCAIN.

References Cited in the file of this patent
UNITED STATES PATENTS

| Number | Name | Date |
|---|---|---|
| 212,424 | Ball | Feb. 18, 1879 |
| 665,015 | Kennedy | Jan. 1, 1901 |
| 1,056,066 | Smith | Mar. 18, 1913 |
| 1,813,264 | Wikle | July 7, 1931 |
| 2,200,000 | Johnstone | May 7, 1940 |
| 2,293,721 | Engler | Aug. 25, 1942 |